S. I. FEKETE.
VALVE MECHANISM.
APPLICATION FILED AUG. 14, 1918.

1,356,914.

Patented Oct. 26, 1920.

Inventor:
Stephen I. Fekete
by Macleod, Calver, Copeland & Dike
Attys

UNITED STATES PATENT OFFICE.

STEPHEN I. FEKETE, OF DETROIT, MICHIGAN, ASSIGNOR TO ESSEX MOTORS, OF DETROIT, MICHIGAN, A CORPORATION OF MICHIGAN.

VALVE MECHANISM.

1,356,914.  Specification of Letters Patent.  Patented Oct. 26, 1920.

Application filed August 14, 1918. Serial No. 249,906.

*To all whom it may concern:*

Be it known that I, STEPHEN I. FEKETE, a subject of the King of Hungary, residing at Detroit, county of Wayne, State of Michigan, have invented a certain new and useful Improvement in Valve Mechanism, of which the following is a specification, reference being had therein to the accompanying drawings.

My invention relates to valve mechanism for internal combustion engines and means for protecting and lubricating the valve mechanism. It has to do particularly with so-called over-head valves by which the explosive mixture is introduced into the cylinder directly above the piston or by which the spent gases are exhausted. My present invention has for its object to provide an over-head valve construction which can be lubricated more perfectly, which is protected from dust, and which is readily accessible. In the accompanying drawings, I have shown my invention as embodied in an inlet valve mechanism and the coöperating parts but it will be understood that my invention is equally applicable to exhaust valve mechanism.

The invention will be fully understood from the following description when taken in connection with the accompanying drawings and the novel features thereof will be pointed out and clearly defined in the claim at the close of this specification.

Figure 1:
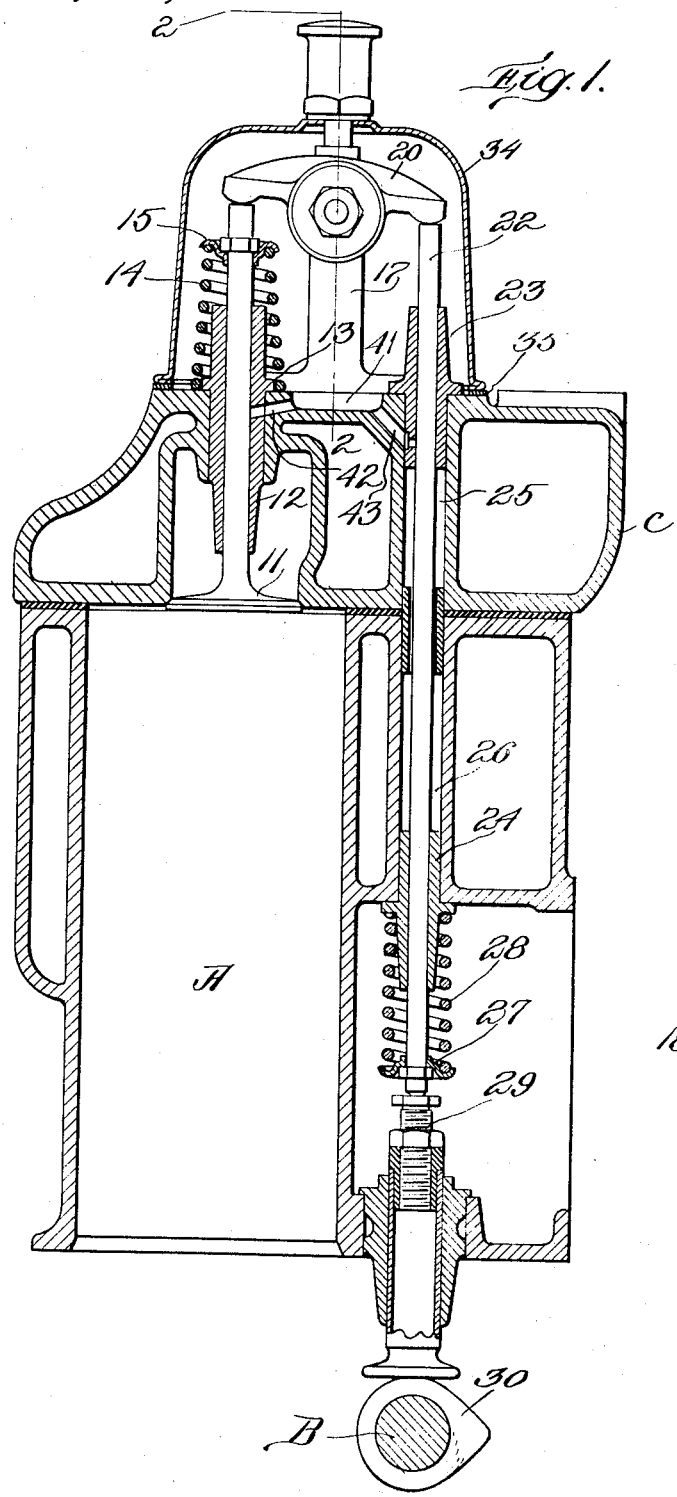

In the drawings, Figure 1 is a vertical section of an engine cylinder and the valve mechanism operating the over-head inlet valve thereon.

Figure 2:
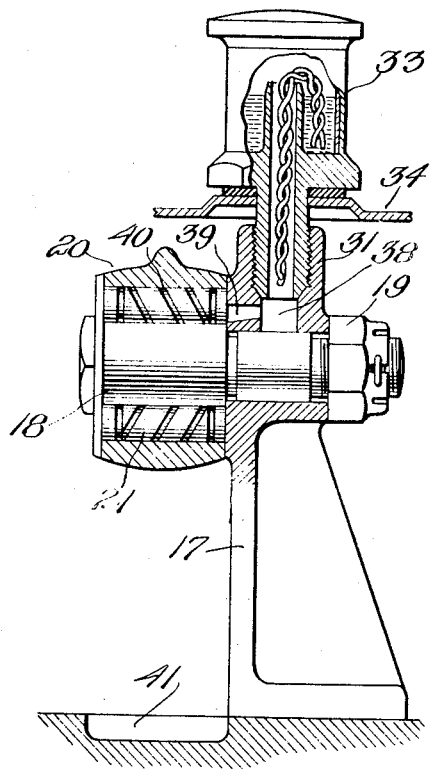

Fig. 2 is a section on line 2—2 of Fig. 1, looking in the direction of the arrows.

Referring to the drawings, the cylinder is shown at A and the cam shaft at B. The cylinder head is removable and is designated C. The inlet valve 11 has a stem which slides in a removable sleeve 12 provided with a shoulder 13 which rests on the upper face of the removable head C. Surrounding the valve stem is a spring 14 one end of which rests on the head C and the other end of which bears against a collar 15 which engages a nut 16 on the valve stem. The spring 14 is of strength sufficient to cause the inlet valve to close in the time allowed. At 17 is shown a bracket mounted on the upper surface of the removable head, said bracket is provided with a hardened stationary axle 18 non-rotatably secured to the bracket by the nut 19. On the axle 18 is a rocker arm 20. Between the axle 18 and the rocker arm 20 is a roller bearing 21. One end of the rocker arm 20 contacts with the upper end of the valve stem of the valve 11. The other end contacts with a long push rod 22 guided in two sleeves 23 and 24, the first of which is located in a hole 25 in the removable head, the second of which, 24, is located in an alined hole 26 in the cylinder block. The push rod 22 is provided with a collar 27 against which rests a valve spring 28 the upper end of which is in contact with the under side of an over-hang on the cylinder block. The lower end of the push rod rests on a valve tappet 29 which is operated by a cam 30 of ordinary construction.

On the top of the bracket 17 is a tubular projection 31 tapped out to receive the screw threaded lower end of an oil cup 32. This oil cup is preferably provided with a wick 33, but may be of any well known construction. At 34 is shown a cover which incloses all the valve mechanism which projects above the top surface of the removable head C. This cover rests on a suitable seat or gasket 35. It is held down by the oil cup or cups 32, the lower end of which extends into the tubular projection 31 on the top of the bracket 17. By this means the cover is held firmly in place over the valve mechanism but may be quickly removed by unscrewing the oil cup 32. It will be understood that there will usually be as many oil cups as there are rocker arms. This avoids the necessity of using additional securing means for the cover and also while permitting access to the oil cups without the removal of the cover makes a dust tight joint so that no dust can enter the space within the cover. As is well known to those skilled in this art, the life of moving parts especially where there is a rubbing or sliding contact is largely dependent upon the completeness with which the parts are protected from dust as well as the perfection of the lubrication.

All of the foregoing parts are lubricated by means of the oil cup 32. The oil from the interior of the oil cup is drawn over by the wick 33 and enters the space 38 about the axle 18. From there it runs through a hole 39 into the roller bearing 21 the rolls of which are grooved as shown at 40 in Fig. 2. The oil drips from the roller bearing 21 into a pocket 41 located just below the bearing. From there, the oil escapes through a port 42 the opening of which intercepts the bore of the sleeve 12 in which is located the inlet valve 11. Another port 43 leads to the bore of the sleeve 23 which surrounds the valve tappet 22. The oil from the port 43 works down the valve tappet 25 and lubricates the sleeve 24. It will thus be apparent that in order to keep the valve mechanism thoroughly lubricated it is necessary for the operator to fill only one oil cup for each cylinder.

The hereindescribed valve mechanism makes the care of the ports very easy. When necessary to grind the valves the cover 34 is removed by unscrewing the oil cups 32. The removable head is then taken off the cylinder block leaving the push rod 32 in the block. The inlet valves may be ground on the bench by turning the head bottom side up.

What I claim is:

The improved valve mechanism for internal combustion engines having a removable head which comprises a valve seated on the lower face of said removable head, a sleeve surrounding the stem of said valve, a spring for said valve, a rocker, a push rod extending through said removable head and said cylinder block, sleeves in the removable head and cylinder block surrounding said push rod and actuating mechanism operating on said push rod, a cover for said valve mechanism, an oil cup exterior to said cover and engaging the rocker arm bracket to hold the said cover in place, there being oil passages from said oil cup through said rocker arm bracket to the space within the cover and from the space within the cover through the sleeves in the removable head to the valve stem and push rod.

In testimony whereof I affix my signature.

STEPHEN I. FEKETE.